UNITED STATES PATENT OFFICE.

HENRY A. GARDNER, OF WASHINGTON, DISTRICT OF COLUMBIA.

PAINT-REMOVER.

1,067,600.

Specification of Letters Patent.

Patented July 15, 1913.

No Drawing.

Application filed July 23, 1912. Serial No. 711,168.

*To all whom it may concern:*

Be it known that I, HENRY A. GARDNER, a citizen of the United States, residing at Washington, in the District of Columbia, have invented certain new and useful Improvements in Paint-Removers, of which the following is a specification.

This invention relates to a composition of matter for removing the paint, varnish, enamel or like finish from surfaces to which such finish has been applied, and consists of a liquid which will dissolve or soften the finish, and of a substance insoluble in the solvent used, which substance will prevent the too rapid evaporation of the solvent.

As a solvent I may use any of the well-known finish-softening solvents such as benzol, acetone, or wood alcohol, or a mixture of such solvents. As an evaporation retarder I use a material, which, while insoluble or substantially insoluble in the finish-removing solvent or in any component thereof, will still have the property of protecting such finish-removing solvent, so that its evaporation will be sufficiently retarded to give the operator time enough to apply to a considerable area, the finish remover, and to remove the softened finish before the solvent has evaporated. I have discovered that a polymerized animal or vegetable oil has this property. The oil may be polymerized by heating animal or vegetable oils, or a mixture thereof, to between 500° and 600° F. and maintaining such temperature until polymerization has taken place, as will be noted by an entire change in the fluidity of the oil, the mass solidifying upon cooling. Treatment of certain oils with sulfuric acid will produce a similar product but not so well fitted for the purpose described herein as the product resulting from the heat treatment. I have found linseed oil or Chinese wood-oil to be suitable for the purposes of this invention, although any other oil having equivalent properties may be used. The oil, thus polymerized, is insoluble or substantially insoluble in carbon bisulfid, acetone, wood alcohol, benzin, benzol, etc., but has the property, when mixed with such solvents of becoming pasty or forming a colloidal solid solution. There is, however, no real solution, as the finish solvent, which appears to be absorbed, may, by pressure, be entirely removed, and the polymerized oil left in its original condition.

In order to make my finish remover, the solid polymerized oil is ground to a fine pulp and intimately mixed with a finish-dissolving liquid, such as benzol, acetone or wood alcohol or analogous solvent, or a mixture of such solvents. As an example, I have used a mixture consisting of—

| | |
|---|---|
| Polymerized oil | 10 parts |
| Benzol | 40 " |
| Acetone | 20 " |
| Wood alcohol | 20 " |
| Castor oil | 10 " |

The castor oil, which may be omitted, is added for the purpose of keeping the polymerized oil soft. As substitutes for the castor oil, there may be used mineral or hydrocarbon oils or vaseline.

If it is desired to make the composition non-inflammable, carbon tetrachlorid, in which the polymerized oil is also insoluble, may be added in suitable proportions.

The mixture of finely-divided polymerized oil and liquid may be applied to the surface to be cleaned with a brush or in any other suitable manner. After the finish-remover has been applied, and the mixture of softened finish and remover scraped or otherwise removed, the cleaned surface is ready for repainting, there being no residual adhering film.

I claim:

1. A finish remover comprising polymerized oil and a finish-dissolving liquid in which the polymerized oil is insoluble.

2. A finish remover comprising polymerized oil, a finish-dissolving liquid in which the polymerized oil is insoluble, and an ingredient for keeping soft the polymerized oil.

3. A finish remover comprising a mixture of finely-divided polymerized oil and a finish-dissolving liquid.

4. A finish remover comprising a mixture of finely-divided polymerized oil, a finish-dissolving liquid, and an ingredient for keeping soft the polymerized oil.

5. A finish remover comprising polymerized oil and a finish-dissolving liquid.

In testimony whereof I affix my signature in presence of two witnesses.

HENRY A. GARDNER.

Witnesses:
N. P. LEONARD,
E. C. TATE.